US010454358B2

(12) United States Patent
Imanishi et al.

(10) Patent No.: US 10,454,358 B2
(45) Date of Patent: Oct. 22, 2019

(54) EDDY CURRENT RETARDER WITH ELECTRICITY GENERATING FUNCTION

(71) Applicant: NIPPON STEEL & SUMITOMO METAL CORPORATION, Tokyo (JP)

(72) Inventors: Kenji Imanishi, Kishiwada (JP); Hiroyuki Yamaguchi, Nishinomiya (JP); Shotaro Kadokawa, Amagasaki (JP); Takuya Fujita, Yao (JP); Hiroshi Nogami, Takatsuki (JP)

(73) Assignee: NIPPON STEEL CORPORATION, Tokyo (JP)

( * ) Notice: Subject to any disclaimer, the term of this patent is extended or adjusted under 35 U.S.C. 154(b) by 253 days.

(21) Appl. No.: 15/115,283

(22) PCT Filed: Feb. 5, 2015

(86) PCT No.: PCT/JP2015/000508
§ 371 (c)(1),
(2) Date: Jul. 29, 2016

(87) PCT Pub. No.: WO2015/122156
PCT Pub. Date: Aug. 20, 2015

(65) Prior Publication Data
US 2017/0005561 A1 Jan. 5, 2017

(30) Foreign Application Priority Data

Feb. 17, 2014 (JP) .................................. 2014-027985

(51) Int. Cl.
*H02K 49/10* (2006.01)
*H02K 1/14* (2006.01)
(Continued)

(52) U.S. Cl.
CPC ............. *H02K 49/106* (2013.01); *H02K 1/14* (2013.01); *H02K 1/17* (2013.01); *H02K 3/18* (2013.01);
(Continued)

(58) Field of Classification Search
CPC .. H02K 1/14; H02K 1/17; H02K 3/18; H02K 49/043; H02K 49/106; H02K 7/104;
(Continued)

(56) References Cited

U.S. PATENT DOCUMENTS 5,944,149 A * 8/1999 Kuwahara ............ H02K 49/043
188/156
6,176,355 B1 * 1/2001 Yamamoto ........... H02K 49/043
188/158
(Continued)

FOREIGN PATENT DOCUMENTS

EP        0948118       10/1999
JP        H01298948     * 12/1989
(Continued)

OTHER PUBLICATIONS

English translation for JPH0583927; Apr. 1993; Shirata et al.*

*Primary Examiner* — Mang Tin Bik Lian
*Assistant Examiner* — Ahmed Elnakib
(74) *Attorney, Agent, or Firm* — Clark & Brody (57) ABSTRACT

An eddy current retarder includes a brake drum, a magnet retention ring, and a switch mechanism. The brake drum is fixed to a rotating shaft. The magnet retention ring is arranged inside the drum and retains magnets at regular intervals entirely in a circumferential direction such that the magnets face the inner peripheral surface of the drum. The switch mechanism includes switch plates that switch, during braking, to a state in which magnetic circuits develop between the magnets and the drum, and switch, during
(Continued)

non-braking, to a state in which no magnetic circuits develop. Protrusions are provided on an end face of the drum at regular intervals entirely in the circumferential direction. Electricity generating coils are provided in a non-rotating part of a vehicle at regular intervals entirely in the circumferential direction such that the electricity generating coils face the regions of the end face of the drum.

3 Claims, 8 Drawing Sheets

(51) Int. Cl.
*H02K 1/17* (2006.01)
*H02K 3/18* (2006.01)
*H02K 7/104* (2006.01)
*H02K 49/04* (2006.01)
*H02K 7/00* (2006.01)

(52) U.S. Cl.
CPC ........... *H02K 7/104* (2013.01); *H02K 49/043* (2013.01); *H02K 7/006* (2013.01)

(58) Field of Classification Search
CPC ........ H02K 7/006; H02K 49/02; H02K 49/04; H02K 49/046
USPC .......................... 310/76–78, 80, 75 R, 92–95
See application file for complete search history.

(56) References Cited

U.S. PATENT DOCUMENTS

| | | | |
|---|---|---|---|
| 2002/0020592 A1* | 2/2002 | Tani | ..................... H02K 49/043 |
| | | | 188/164 |
| 2018/0138795 A1* | 5/2018 | Imanishi | ............... H02K 49/043 |

FOREIGN PATENT DOCUMENTS

| | | | |
|---|---|---|---|
| JP | 5-048581 | | 2/1993 |
| JP | H079085 | * | 2/1995 |
| JP | 7-143732 | | 6/1995 |
| JP | H07143732 | * | 6/1995 |
| JP | 10-127041 | | 1/1998 |
| JP | H11187641 | * | 7/1999 |
| JP | 2001-054276 | | 2/2001 |
| JP | 2002-125361 | | 4/2002 |
| JP | 2011-182574 | | 9/2011 |

* cited by examiner

EDDY CURRENT RETARDER WITH ELECTRICITY GENERATING FUNCTION

TECHNICAL FIELD

The present invention relates to an eddy current retarder that is to be mounted, as an auxiliary brake, to a vehicle such as a truck and a bus. In particular, the present invention relates to an eddy current retarder with an electricity generating function that is capable of converting the rotational motion energy of a rotating shaft of a vehicle into braking force, as well as collecting the rotational motion energy as electricity.

BACKGROUND ART

Magnets are indispensable for an eddy current retarder (hereafter, also simply referred to as a retarder) because it generate a magnetic field that provides braking force. Retarders are divided roughly into those using permanent magnets and those electromagnets. In general, the retarder of any type includes a braking member that is fixed to a rotating shaft such as a propeller shaft. During braking, the action of magnetic fields from magnets generates eddy current on the surface of the braking member facing the magnets. This causes braking force in a direction opposite to a rotational direction on the braking member that rotates together with the rotating shaft, which makes the rotation of the rotating shaft slow down. The retarders are categorized into a drum type and a disc type depending on the shape of the braking member and the shape of a magnet retention member that retains the magnets and pairs off with the braking member. There are also various mechanisms for switching between braking and non-braking.

In recent years, along with the prevention of global warming, the improvement in living environment and the reduction in oil dependence have been promoted. For this reason, hybrid electric vehicles (HEVs) and electric vehicles (EVs), which generate motive power for propulsion with an electric motor, have come into widespread use in the areas of not only small vehicles such as cars but also large vehicles such as trucks and buses. In most cases, a large vehicle is equipped with a number of electric components that require electricity. To supply the electricity, a large vehicle is provided with an electric power generator such as an alternator that receives motive power from an engine to generate electricity. However, in large vehicles such as HEVs and EVs, there is a limit to supplying the electricity only by an electric power generator such as an alternator. This is because a propulsion electric motor heavily consumes electricity. For this reason, adding an electricity generating function to a retarder is very useful.

There are prior art retarders with an electricity generating function, as described below.

Japanese Patent Application Publication No. 7-143732 (Patent Literature 1), Japanese Utility Model Laid-Open No. 5-48581 (Patent Literature 2), Japanese Patent Application Publication No. 10-12741 (Patent Literature 3), and Japanese Patent Application Publication No. 2001-54276 (Patent Literature 4) each disclose a drum type, electromagnet-type retarder with an electricity generating function. This retarder includes a cylindrical braking member that is fixed to a rotating shaft of a vehicle, a cylindrical wound coil retention member that is arranged inside and concentric with this braking member, and a permanent magnet retention member that is arranged inside and concentric with this wound coil retention member. The wound coil retention member is of a ferromagnetic material, and is fixed to a non-rotating part of the vehicle. The wound coil retention member retains a plurality of excitation coils (including iron cores) on its outer peripheral surface entirely in its circumferential direction, and retains a plurality of electricity generating coils (including iron cores) on its inner peripheral surface entirely in its circumferential direction. The permanent magnet retention member is integral with the braking member and retains a plurality of permanent magnets on its outer peripheral surface entirely in its circumferential direction.

In the retarders disclosed in Patent Literatures 1 to 4, the excitation coils serve as electromagnets by a current supply, and magnetic circuits develop between the electromagnet and the braking member. Then, with relative rotation between the braking member and the wound coil retention member, magnetic fields from the electromagnets fluctuate. This causes eddy current to be generated on the inner peripheral surface of the braking member, providing braking force. Furthermore, magnetic circuits develop between the electricity generating coils and the permanent magnets. Then, with relative rotation between the permanent magnet retention member and the wound coil retention member, magnetic fields from the permanent magnets penetrating the electricity generating coils fluctuate. This causes induced current to flow in the electricity generating coils, providing electricity.

Japanese Patent Application Publication No. 2011-182574 (Patent Literature 5) discloses a drum type, or a disc type, permanent-magnet type retarder with an electricity generating function. This retarder includes, in the case of drum type one, a cylindrical braking member that is fixed to a rotating shaft of a vehicle, a magnet retention member that is arranged inside and concentric with this braking member, a brake disc that is integral with this magnet retention member, and a brake caliper that is fixed to a non-rotating part of the vehicle with the brake disc interposed therebetween. The magnet retention member is of a ferromagnetic material and rotatably supported by the rotating shaft of the vehicle. The magnet retention member retains a plurality of permanent magnets entirely in its circumferential direction such that the permanent magnets face the inner peripheral surface of the braking member. In the inner peripheral surface of the braking member, a plurality of electricity generating coils (including iron cores) are embedded entirely in its circumferential direction.

In the retarder disclosed in Patent Literature 5, the brake caliper is not operated during non-braking. In this state, with the rotation of the braking member, the action of magnetic fields from the permanent magnets causes the magnet retention member to rotate in synchronization with the braking member. That is, no relative rotational speed difference arises between the braking member and the permanent magnets, and thus the magnetic fields from the permanent magnets do not fluctuate. This prevents eddy current from being generated on the inner peripheral surface of the braking member, generating no braking force. Furthermore, the magnetic fields penetrating the electricity generating coils do not fluctuate either. This prevents induced current from flowing in the electricity generating coils, generating no electricity.

On the other hand, the brake caliper is operated during braking. This causes the rotation of the brake disc to stop, thereby making the magnet retention member come to rest. Then, a relative rotational speed difference arises between the braking member and the permanent magnets, and thus the magnetic fields from the permanent magnets fluctuate. This causes eddy current to be generated on the inner peripheral surface of the braking member, generating braking force. Furthermore, the magnetic fields penetrating the electricity generating coils also fluctuate. This causes induced current to flow in the electricity generating coils, generating electricity.

CITATION LIST

Patent Literature

Patent Literature 1: Japanese Patent Application Publication No. 7-143732
Patent Literature 2: Japanese Utility Model Laid-Open No. 5-48581
Patent Literature 3: Japanese Patent Application Publication No. 10-12741
Patent Literature 4: Japanese Patent Application Publication No. 2001-54276
Patent Literature 5: Japanese Patent Application Publication No. 2011-182574

SUMMARY OF INVENTION

Technical Problem

In the retarders disclosed in Patent Literatures 1 to 4 described above, it is necessary to provide electromagnets, namely excitation coils to provide braking force, which is an essential function. In addition, in order to add the electricity generating function, it is necessary to provide the electricity generating coils as well as the permanent magnets. For this reason, the number of components increases. Moreover, magnetic circuits develop between the electricity generating coils and the permanent magnets all the time. This causes the magnetic fields from the permanent magnets penetrating the electricity generating coils to fluctuate also during non-braking with relative rotation between the permanent magnet retention member and the wound coil retention member. For this reason, under Fleming's left-hand rule, a rotational resistance acts on the permanent magnet retention member. As a result, smooth rotation of the braking member integral with the permanent magnet retention member is inhibited, and thus smooth rotation of the rotating shaft as well.

In contrast, in the retarder disclosed in Patent Literature 5 described above, the magnets for providing braking force, namely the permanent magnets are utilized for adding the electricity generating function. Therefore, only providing the electricity generating coils suffices. In addition, since the magnetic fields from the permanent magnets penetrating the electricity generating coils do not fluctuate during non-braking, smooth rotation of the braking member as well as the rotating shaft is not inhibited. However, the electricity generating coils are provided in the braking member rotating with respect to the non-rotating part of the vehicle, which requires a contrivance for the structure of electric contacts with conductors drawn from the electricity generating coils.

The present invention is made in the light of the above problems and has an objective to provide an eddy current retarder with an electricity generating function with the following characteristics:

Adding the electricity generating function while minimizing an increase in the number of components;
Not inhibiting smooth rotation of the rotating shaft during non-braking; and
Simplifying a structure for routing the conductors drawn from the electricity generating coils.

Solution to Problem

An eddy current retarder with an electricity generating function according to embodiments of the present invention includes a braking member, a magnet retention member, and a brake switching mechanism, and furthermore has a configuration (1) or (2) described below.

The braking member is cylindrical and is fixed to a rotating shaft of a vehicle.

The magnet retention member is a ferromagnetic material arranged inside the braking member, the magnet retention member retains a plurality of magnets at regular intervals entirely in a circumferential direction such that the magnets face the inner peripheral surface of the braking member.

The brake switching mechanism switches, during braking, to a state in which magnetic circuits develop between the magnets and the braking member, and switches, during non-braking, to a state in which no magnetic circuits develop.

(1) The retarder has the following configuration:
a plurality of protrusions are provided on an end face of the braking member in the axial direction of the braking member at regular intervals entirely in the circumferential direction;
a plurality of electricity generating coils are provided in a non-rotating part of the vehicle at regular intervals entirely in the circumferential direction such that the electricity generating coils face the regions of the end face of the braking member where the protrusions are provided; and
during braking, the positions of the magnets coincide with the positions of the electricity generating coils in the circumferential direction.

(2) The retarder has the following configuration:
a plurality of notch portions are provided in an end portion of the braking member in the axial direction of the braking member at regular intervals entirely in the circumferential direction;
a plurality of electricity generating coils are provided in a non-rotating part of the vehicle at regular intervals entirely in the circumferential direction such that the electricity generating coils face the regions of the end portion of the braking member where the notch portions are provided, from the outer peripheral surface side of the braking member;
during braking, the positions of the magnets coincide with the positions of the electricity generating coils in the circumferential direction.

The retarder of the above (2) preferably has a configuration in which the outer diameter of the end portion of the braking member where the notch portions are provided is smaller than the outer diameter of the portion of the braking member other than the notch portions.

In the above-described retarders, it is preferable that the magnets are permanent magnets, the permanent magnets are arranged such that the orientation of the magnetic poles of each permanent magnet is in a radial direction, and the permanent magnets are arranged such that different magnetic poles of adjacent permanent magnets in the circumferential direction alternate.

This retarder can have the following configuration:
as the brake switching mechanism, a plurality of switch plates of a ferromagnetic material are provided in a gap between the inner peripheral surface of the braking member and the permanent magnets at regular intervals entirely in the circumferential direction such that an arrangement angle of the switch plates matches an arrangement angle of the permanent magnets; and the switch plates is configured to turn relatively to the magnet retention member in the circumferential direction, is kept during braking in a state of being superposed on the permanent magnets, and is kept during non-braking in a state of bridging between the permanent magnets adjacent to each other.

Advantageous Effects of Invention

The eddy current retarder with an electricity generating function according to the present invention has remarkable effects as follows:
- Capable of adding the electricity generating function while minimizing an increase in the number of components;
- Not inhibiting smooth rotation of the rotating shaft during non-braking; and
- Capable of simplifying a structure for routing the conductors drawn from the electricity generating coils.

DESCRIPTION OF EMBODIMENTS

Generating electricity with an electricity generating coil requires fluctuations of a magnetic field that penetrates the electricity generating coil from a magnet. In this regard, conventional retarders with a generating function utilize a relative rotational speed difference between a magnet and an electricity generating coil. This causes the above problems to become evident.

Thus, the present inventors studied a technique to generate electricity considering not utilizing a relative rotational speed difference between a magnet and an electricity generating coil. As a result, with a drum type retarder as a basis, the present inventors found that it is effective to devise the mounting positions of electricity generating coils, and further to devise the shape of a cylindrical braking member (hereafter, also referred to as a brake drum).

In a drum type retarder, in order to add the electricity generating function while minimizing an increase in the number of components, the following configuration is effective. The configuration utilizes magnets (permanent magnets or electromagnets) for providing braking force, including electricity generating coils without including new permanent magnets. In addition, in order to simplify a structure for routing conductors drawn from the electricity generating coils, as well as not to inhibit smooth rotation of a rotating shaft during non-braking, the following configuration is effective. The electricity generating coils are fixed to a non-rotating part of a vehicle, and only during braking, magnetic circuits are caused to develop not only between the magnets and the brake drum but also between the magnets and the electricity generating coils.

However, only the magnetic circuits developing between the magnets and the electricity generating coils during braking does not suffice. This is because electricity is not generated unless the magnetic fields penetrating the electricity generating coils fluctuate.

For this problem, the following configuration is effective. Protrusions are provided on an end face of the brake drum in the axial direction of the brake drum, and electricity generating coils are provided so as to face the regions of the end face of the brake drum where these protrusions are provided. This configuration causes, when the brake drum rotates during braking, some of the magnetic fields from magnets, which are used originally for generating braking force, to repeatedly penetrate the electricity generating coils through the protrusions on the end face of the brake drum. That is, the magnetic fields penetrating the electricity generating coils fluctuates during braking.

In addition, the following configuration is also effective. Notch portions are provided in an end portion of the brake drum in the axial direction of the brake drum, and electricity generating coils are provided so as to face the regions of the end portion of the brake drum where these notch portions are provided (hereafter, also referred to as a notched end portion), from an outer peripheral surface side of the notched end portion. This configuration causes, when the brake drum rotates during braking, some of the magnetic fields from magnets, which are used originally for generating braking force, to repeatedly penetrate the electricity generating coils through the notched end portion of the brake drum. That is, the magnetic fields penetrating the electricity generating coils fluctuates during braking.

The present invention is completed based on the above findings. Hereinafter, there will be described preferred embodiments of an eddy current retarder with an electricity generating function according to the present invention.

First Embodiment

Figure 1:
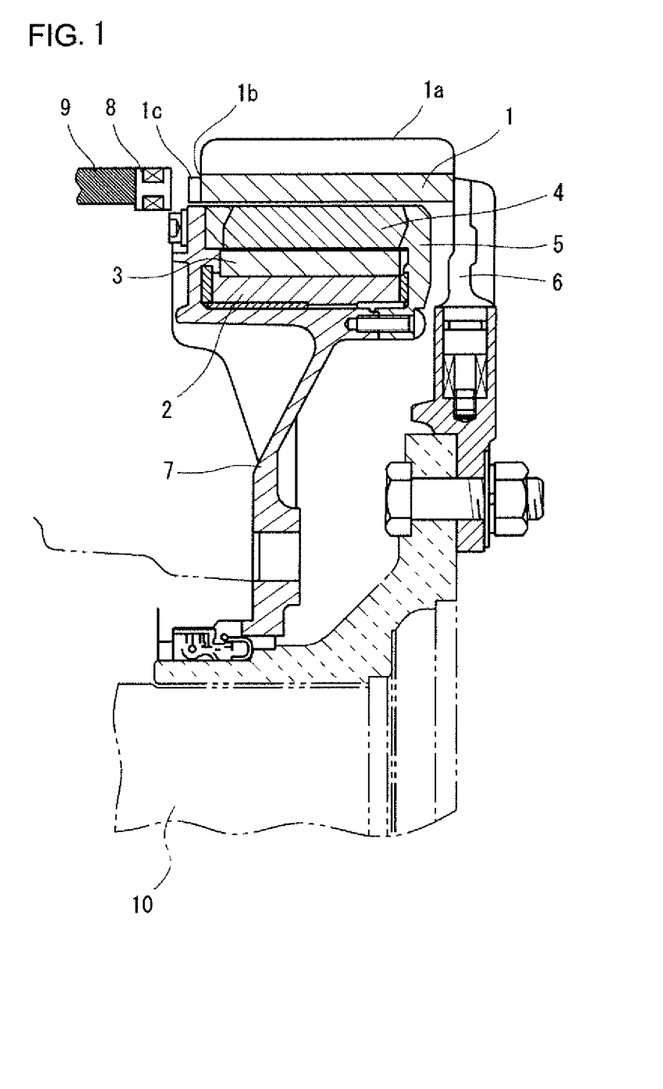
FIG. 1 is a vertical cross sectional view illustrating a configuration example of an eddy current retarder with an electricity generating function as a first embodiment of the present invention, the vertical cross sectional view being taken along the axial direction of the retarder.
Figure 2A:
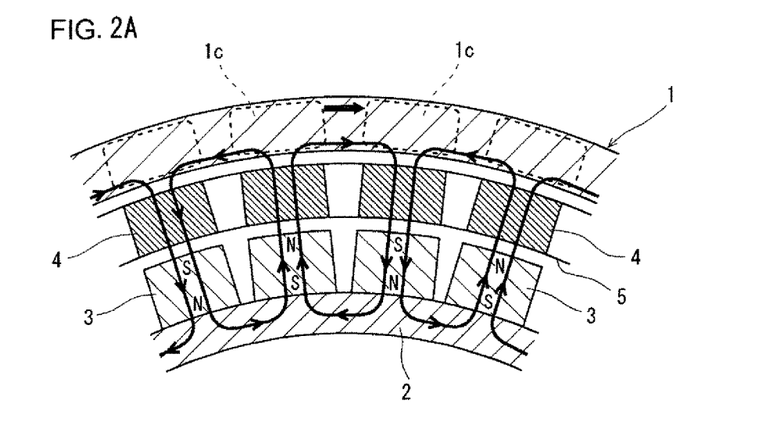
FIG. 2A is a cross sectional view illustrating a state of the retarder in the first embodiment at an instant in braking.
Figure 2B:
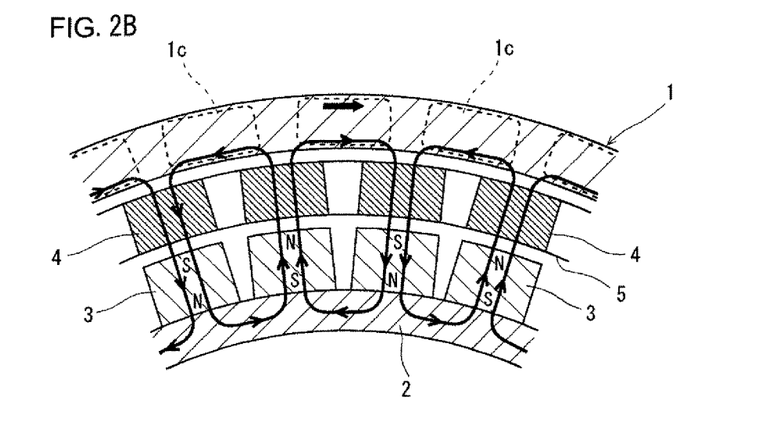
FIG. 2B is a cross sectional view illustrating a state of the retarder in the first embodiment at another instant in braking.
Figure 2C:
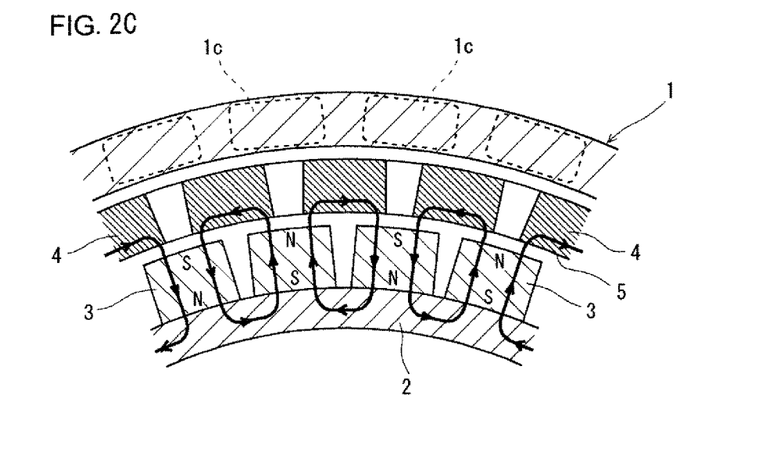
FIG. 2C is a cross sectional view illustrating a state of the retarder in the first embodiment at an instant in non-braking.
Figure 3:
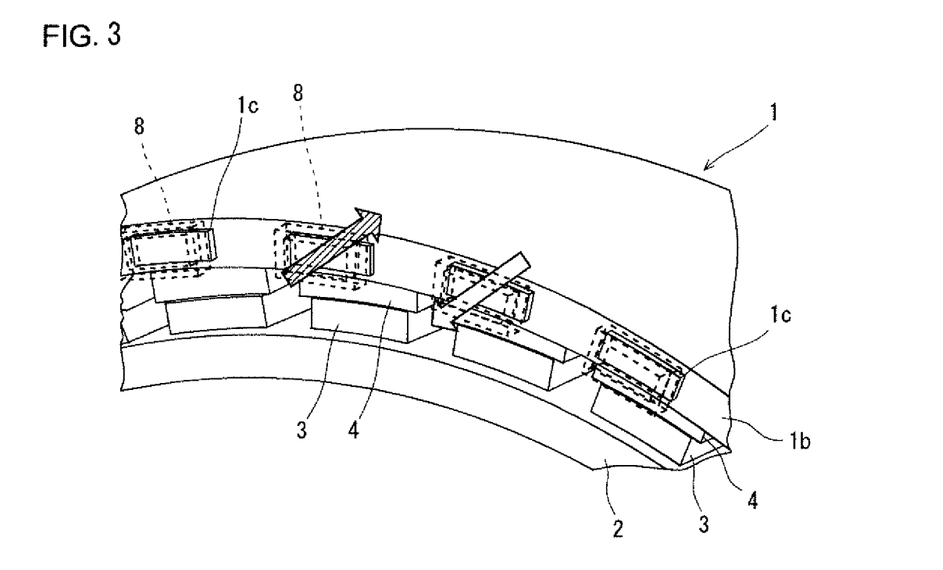
FIG. 3 is a partially enlarged perspective view of the retarder in the first embodiment.

FIG. 1 is a vertical cross sectional view illustrating a configuration example of an eddy current retarder with an electricity generating function as a first embodiment of the present invention, the vertical cross sectional view being taken along the axial direction of the retarder. FIG. 2A to FIG. 2C are cross sectional views of the retarder in the first embodiment, illustrating the main parts of the retarder cut away along a direction perpendicular to the axial direction. Of these drawings, FIG. 2A and FIG. 2B illustrate the states at different instants in braking, respectively. FIG. 2C illustrates the state at an instant in non-braking. FIG. 3 is a partially enlarged perspective view of the retarder in the first embodiment. To facilitate understanding of the device configuration, in FIG. 2A to FIG. 2C, protrusions 1c, which are provided on an end face 1b of a brake drum 1, are clearly shown by dotted lines. Note that, in FIG. 2A to FIG. 2C, and FIG. 3, a radiator fin 1a (see FIG. 1), which is provided on the outer peripheral surface of the brake drum 1, will not be illustrated.

The retarder in the first embodiment illustrated in these drawings is a drum type, a permanent-magnet type retarder. For this retarder, permanent magnets 3 are used as a magnet to generate braking force, and a turning switch mechanism for switching between braking and non-braking is employed. Specifically, as illustrated FIG. 1, the retarder in the first embodiment includes the brake drum 1 that is cylindrical, a magnet retention ring 2 that is disposed inside this brake drum 1, and a switch plate retention ring 5 that is arranged between the brake drum 1 and the magnet retention ring 2, being concentric with this magnet retention ring 2.

The brake drum 1 corresponds to a braking member to which braking force is applied. The brake drum 1 is fixed to a rotating shaft 10 (e.g., a propeller shaft) of a vehicle via a rotor support member 6 and rotates together with the rotating shaft 10. On the outer circumference of the brake drum 1, the radiator fin 1a is provided. This radiator fin 1a plays a role of cooling the brake drum 1 itself.

The magnet retention ring 2 corresponds to a magnet retention member that pairs off with the brake drum 1 (the braking member). The magnet retention ring 2 is supported by a stator support member 7, so as to turn about the rotating shaft 10. The stator support member 7 is fixed to a non-rotating part of the vehicle (e.g., a transmission cover). At the time of switching between braking and non-braking, the magnet retention ring 2 is made to turn by the operation of an air cylinder, an electric actuator, or the like, which is not illustrated.

The outer peripheral surface of the magnet retention ring 2 faces the inner peripheral surface of the brake drum 1, which serves as a braking face. To the outer peripheral surface of the magnet retention ring 2, entirely in its circumferential direction, a plurality of the permanent magnets 3 are adhered. The permanent magnets 3 face the inner peripheral surface of the brake drum 1, and the magnetic poles (the north pole and the south pole) thereof are oriented in the radial direction of the rotating shaft 10. Then, the permanent magnets 3 are arranged at regular intervals such that magnetic poles adjacent to each other in the circumferential direction differ alternately (see FIG. 2A to FIG. 2C). The material of the magnet retention ring 2 is a ferromagnetic material.

The switch plate retention ring 5 retains, in its circumferential direction, a plurality of switch plates 4 made of a ferromagnetic material, which are necessary for the turning switch mechanism, and is fixed to the stator support member 7. Specifically, the switch plates 4 are provided in the gap between the inner peripheral surface of the brake drum 1 and the permanent magnet 3, entirely in its circumferential direction, such that the arrangement angle of the switch plates 4 matches that of the permanent magnets 3. Each switch plate 4 is substantially the same in size as a single permanent magnet 3.

Here, a plurality of protrusions 1c are provided on the end face 1b that is open one of both end faces of the brake drum 1 in its axial direction, namely on the end face 1b where the rotor support member 6 for supporting the brake drum 1 is absent. This is for giving rise to the electricity generating function. These protrusions 1c are arranged at regular intervals entirely in the circumferential direction. As illustrated in FIG. 2A to FIG. 2C, the arrangement angle of the protrusions 1c matches that of the permanent magnets 3.

The material quality of the brake drum 1 including the protrusions 1c is ferromagnetic material such as a carbon steel and cast iron. It is more preferable that such a material is used as the base metal of the brake drum 1, and the near-surface portion of the inner peripheral surface is made of a good-conductive material such as a copper and copper alloy. This is because a braking efficiency is thereby enhanced.

Furthermore, a plurality of electricity generating coils 8 are mounted so as to face the regions of the end face 1b of the brake drum 1 where the protrusions 1c are provided. These electricity generating coils 8 are arranged at regular intervals in a circumferential direction about the rotating shaft 10. The arrangement angle of the electricity generating coils 8 matches that of the permanent magnets 3.

Each electricity generating coil 8 is a wound coil made by winding a conductor having a high conductivity, such as a copper wire, around an iron core in layers. These electricity generating coils 8 are fixed to a coil support member 9 of a ferromagnetic material and fixed via this coil support member 9 to the non-rotating part of the vehicle (e.g., the transmission cover). The conductors of the electricity generating coils 8 are drawn from the retarder and connected through a control circuit to a storage battery that is installed in the vehicle.

There will be described below the operation of the retarder with an electricity generating function in the first embodiment having such a configuration. During non-braking, as illustrated in FIG. 2C, each switch plate 4 is kept in a state of bridging between permanent magnets 3 adjacent to each other.

In this case, as illustrated by solid arrows in FIG. 2C, magnetic fluxes (a magnetic field) from the permanent magnets 3 do not reach the brake drum 1. Specifically, the magnetic fluxes from the permanent magnet 3 pass through the switch plate 4, thereafter reach adjacent permanent magnets 3, and return through the magnet retention ring 2. That is, no magnetic circuits develop between the permanent magnets 3 and the brake drum 1.

In this state during non-braking, since there is no magnetic field reaching the brake drum 1, no eddy currents are generated on the inner peripheral surface of the brake drum 1, and thus no braking force is generated. In addition, since there is no magnetic field reaching the brake drum 1, there is no magnetic field leaking from the protrusions 1c on the end face 1b of the brake drum 1 as a natural result. In that case, there is no magnetic field reaching the electricity generating coils 8 either, and thus no induced currents are generated in the electricity generating coils 8, generating no electricity.

On the other hand, during braking, as illustrated in FIG. 2A and FIG. 2B, the magnet retention ring 2 is turned by half of the arrangement angle of the permanent magnets 3 about the rotating shaft 10. This makes each switch plate 4 kept in a state of being superposed on each permanent magnet 3. In this state, the positions of the permanent magnets 3 coincide with those of the electricity generating coils 8 in the circumferential direction.

In this case, as illustrated by solid arrows in FIG. 2A and FIG. 2B, the magnetic fluxes from the permanent magnets 3 penetrate the switch plate 4 facing it to reach the brake drum 1, thereafter penetrate adjacent switch plates 4 to reach permanent magnets 3 facing the adjacent switch plates 4, and return through the magnet retention ring 2. That is, magnetic circuits develop between the permanent magnets 3 and the brake drum 1.

In this state during braking, the magnetic circuits develop between the permanent magnets 3 and the brake drum 1, with a relative rotational speed difference occurring between them. For this reason, the magnetic fields on the inner peripheral surface of the brake drum 1 fluctuate. These fluctuations in magnetic fields cause eddy currents on the inner peripheral surface of the brake drum 1. The interaction between these eddy currents and the density of the magnetic fluxes from the permanent magnets 3 causes, under Fleming's left-hand rule, braking force in a direction opposite to the rotational direction on the brake drum 1 that rotates together with the rotating shaft 10 (see solid black arrows in FIG. 2A and FIG. 2B).

Here, during braking, the brake drum 1 rotates while the permanent magnets 3 and the electricity generating coils 8 are at a standstill with their positions in the circumferential direction coinciding with each other. For this reason, the protrusions 1c provided on the end face 1b of the brake drum 1 are alternately brought into a state where they are positioned facing the electricity generating coils S (see FIG. 2A and FIG. 3) and a state where they are positioned between electricity generating coils 8 adjacent to each other (see FIG. 2B).

When the protrusions 1c are positioned facing the electricity generating coils 8, some of the magnetic fluxes reaching the brake drum 1 from a permanent magnet 3 converge into a protrusion 1c, and leak from there toward the electricity generating coil 8 to reach the electricity generating coil 8 (see a solid white arrow in FIG. 3). These magnetic fluxes having reached the electricity generating coil 8 penetrate the electricity generating coil 8 to reach the coil support member 9, thereafter penetrate adjacent electricity generating coils 8, and pass through protrusions is facing the adjacent electricity generating coils 8, returning the brake drum 1 (see a hatched arrow in FIG. 3). That is, magnetic circuits also develop between the permanent magnets 3 and the electricity generating coils 8 through the brake drum 1.

In contrast, as illustrated in FIG. 2B, when the protrusions 1c are positioned between electricity generating coils 8 adjacent to each other, the protrusions 1c does not face the electricity generating coils 8. For this reason, the magnetic fluxes from the permanent magnets 3 reaching the brake drum 1 do not leak from the protrusions 1c, or even otherwise leaking magnetic fluxes are few. That is, the magnetic circuits between the permanent magnets 3 and the electricity generating coils 8 are interrupted.

As seen from the above, during braking, magnetic fluxes repeatedly penetrate the electricity generating coils 8 through the protrusions 1c on the end face 1b of the brake drum 1, and the magnetic fields penetrating the electricity generating coils 8 fluctuate. This causes induced currents by electromagnetic induction to flow through the electricity generating coils 8, generating electricity.

As seen from the above, according to the retarder with an electricity generating function in the first embodiment, it is possible to generate eddy current on the inner peripheral surface of the brake drum 1 all the time during braking, enabling the stable securement of braking force. At the same time, it is possible to generate induced currents in the electricity generating coils 8, enabling the generation of electricity. The induced currents generated in the electricity generating coils 8 can be collected through the conductors that are drawn from the retarder and stored in the storage battery as electricity. The electricity collected in the storage battery is used as power sources for a number of electric components mounted in a large vehicle. In the case of a large HEV and a large EV, the electricity collected in the storage battery is used also as a power source for a propulsion electric motor.

In addition, in the retarder with an electricity generating function in the first embodiment, no new permanent magnets are mounted to add the electricity generating function. That is, what suffices to add the electricity generating function is only utilizing magnets (the permanent magnets 3) for generating braking force, which is an essential function, and mounting the electricity generating coils 8. For this reason, it is possible to minimize an increase in the number of components.

In addition, fixing the electricity generating coils 8 to the non-rotating part of the vehicle simplifies a structure for routing the conductors drawn from the electricity generating coils 8. In addition, since the development of the magnetic circuits between the permanent magnets 3 and the brake drum 1, and the development of the magnetic circuits between the permanent magnets 3 and the electricity generating coils 8 are limited during braking, smooth rotation of the rotating shaft 10 is not inhibited during non-braking.

The smaller the gap between the electricity generating coils 8 and the protrusions 1c of the brake drum 1, the better, but a practical size of the gap is about 1 to 2 mm. This is because an excessively small gap therebetween may cause accidental contact between the electricity generating coils 8 and the protrusions 1e, leading to breakage, and on the other hand, an excessively large gap results in ineffective magnetic circuits between the permanent magnets 3 and the electricity generating coils 8 during braking.

In addition, it is preferable that the width of a single protrusion 1c of the brake drum 1 along the circumferential direction is made substantially identical to the width of a single electricity generating coil 8. This is because such a width results in the development of effective fluctuations in magnetic fluxes penetrating the electricity generating coils 8 through the protrusions 1c.

Furthermore, it is preferable to make the projection height of a single protrusion 1c of the brake drum 1 about 5 to 10 mm. This is because an excessively small projection height thereof results in ineffective fluctuations in magnetic fluxes penetrating the electricity generating coils 8 through the protrusion 1c, and on the other hand, an excessively large projection height thereof results in ineffective magnetic circuits between the permanent magnets 3 and the electricity generating coils 8 during braking.

The shape of a single protrusion 1c is not specially limited but is preferably a substantially rectangular-parallelepiped shape made by combining rectangular planes.

Second Embodiment

Figure 4:
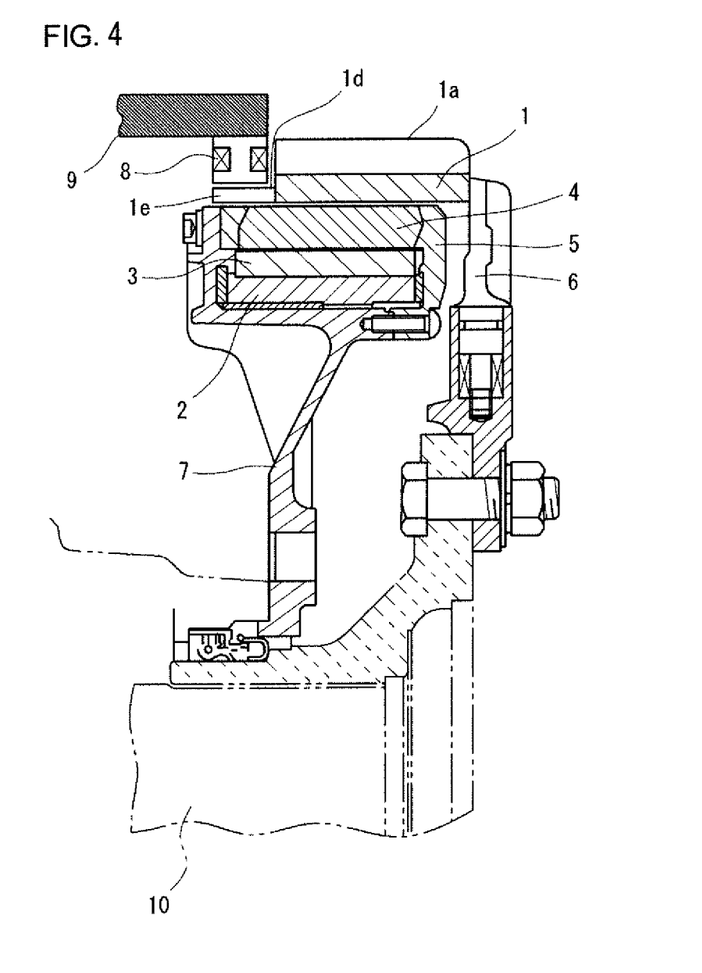
FIG. 4 is a vertical cross sectional view illustrating a configuration example of an eddy current retarder with an electricity generating function as a second embodiment of the present invention, the vertical cross sectional view being taken along the axial direction of the retarder.
Figure 5A:
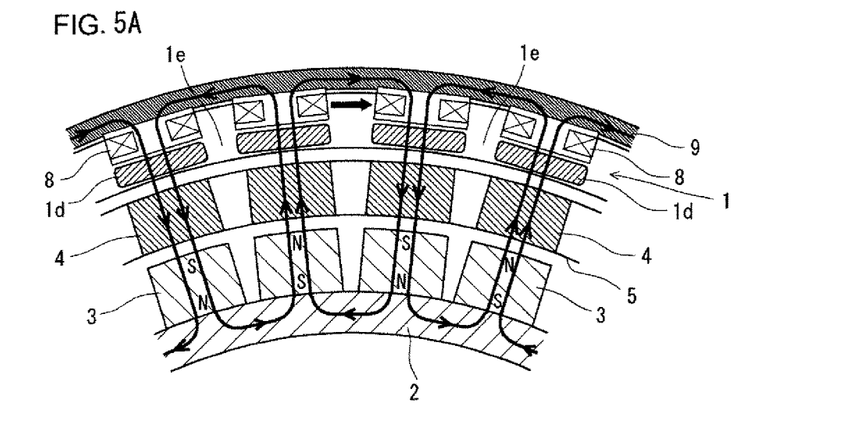
FIG. 5A is a cross sectional view illustrating a state of the retarder in the second embodiment at an instant in braking.
Figure 5B:
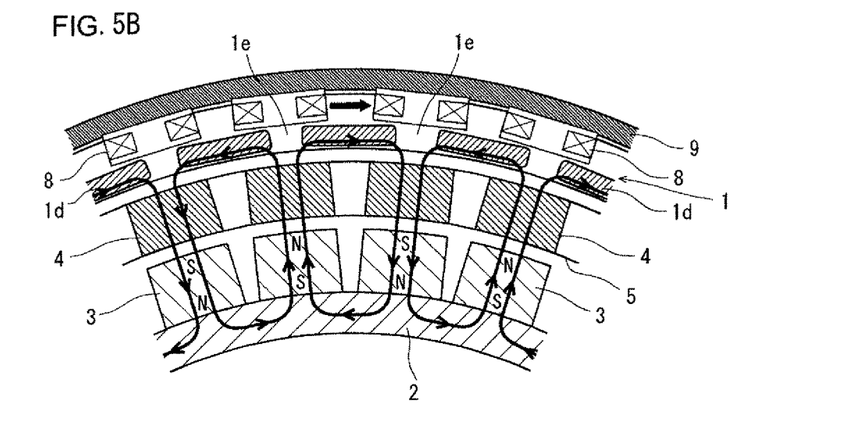
FIG. 5B is a cross sectional view illustrating a state of the retarder in the second embodiment at another instant in braking.
Figure 5C:
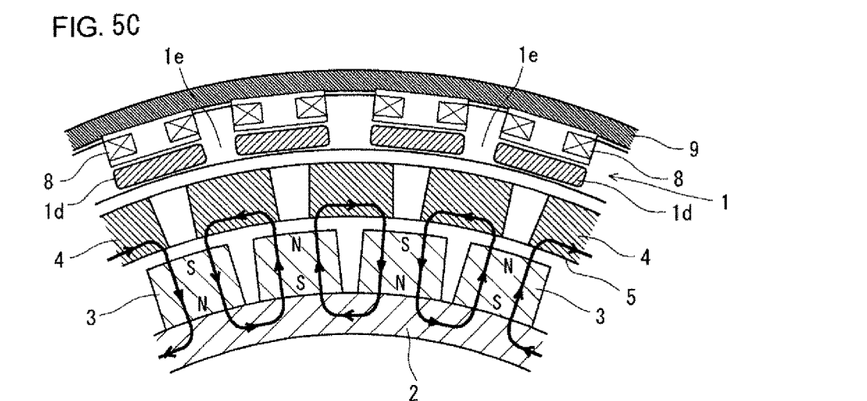
FIG. 5C is a cross sectional view illustrating a state of the retarder in the second embodiment at an instant in non-braking.
Figure 6:
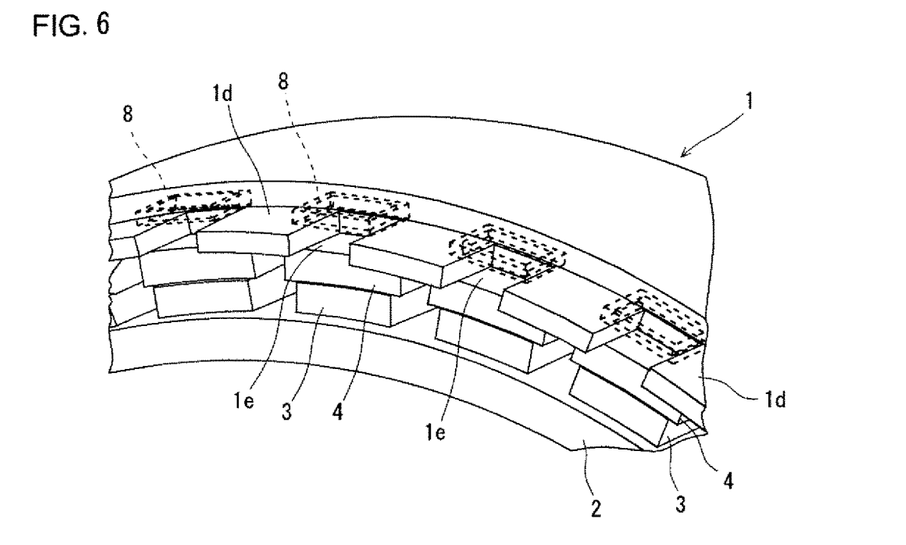
FIG. 6 is a partially enlarged perspective view of the retarder in the second embodiment.

FIG. 4 is a vertical cross sectional view illustrating a configuration example of an eddy current retarder with an electricity generating function as a second embodiment of the present invention, the vertical cross sectional view being taken along the axial direction of the retarder. FIG. 5A to FIG. 5C are cross sectional views of the retarder in the second embodiment, illustrating the main parts of the retarder cut away along a direction perpendicular to the axial direction. Of these drawings, FIG. 5A and FIG. 5B illustrate the states at different instants in braking, respectively. FIG. 5C illustrates the state at an instant in non-braking. FIG. 6 is a partially enlarged perspective view of the retarder in the second embodiment. The retarder in the second embodiment illustrated in these drawings is based on the configuration of the retarder in the first embodiment, but the mounting positions of the electricity generating coils and the shape of the brake drum are different from those in the first embodiment.

Specifically, a plurality of notch portions $1e$ are provided in an end portion $1d$ that is open one of both end portions of the brake drum 1 in its axial direction, namely in the end portion $1d$ where the rotor support member 6 for supporting the brake drum 1 is absent. This is for giving rise to the electricity generating function. These notch portions $1e$ are arranged in the end portion $1d$ at regular intervals entirely in the circumferential direction. As illustrated in FIG. 5A to FIG. 5C, the arrangement angle of the notch portions $1e$ matches that of the permanent magnets 3.

Furthermore, the plurality of electricity generating coils 8 are mounted so as to face the regions of the notched end portions $1d$ of the brake drum 1 from the outer peripheral surface side of the notched end portions $1d$. These electricity generating coils 8 are arranged at regular intervals in a circumferential direction about the rotating shaft 10. The arrangement angle of the electricity generating coils 8 matches that of the permanent magnets 3, as illustrated in FIG. 5A to FIG. 5C, and FIG. 6.

Note that, in the retarder in the second embodiment, the outer diameter of the notched end portions $1d$ of the brake drum 1 is smaller than the outer diameter of the portion of the brake drum 1 other than the end portions $1d$. That is, the outer peripheral surfaces of the notched end portions $1d$ of the brake drum 1 are made a step lower to form recessed spaces, and the above electricity generating coils 8 are housed in the recessed spaces. This mode is useful in that it is possible to suppress an increase in size of the retarder as a whole even with the electricity generating coils 8 mounted thereto.

There will be described below the operation of the retarder with an electricity generating function in the second embodiment having such a configuration. During non-braking, as illustrated in FIG. 5C, each switch plate 4 is kept in a state of bridging between the permanent magnets 3 adjacent to each other, as in the first embodiment. In this case, since no magnetic circuits develop between the permanent magnet 3 and the brake drum 1, no braking force is generated, and no electricity is generated. At this point, the state of the portion of the brake drum 1 other than the notched end portions $1d$ is the same as the state illustrated in FIG. 2C described above (except that there are no protrusions $1c$).

On the other hand, during braking, as illustrated in FIG. 5A and FIG. 5B, the magnet retention ring 2 is turned, as in the first embodiment. This makes each switch plate 4 kept in a state of being superposed on each permanent magnet 3, and the positions of the permanent magnets 3 coincide with those of the electricity generating coils S in the circumferential direction. At this point, the state of the portion of the brake drum 1 other than the notched end portions $1d$ is the same as the state illustrated in FIG. 2A and FIG. 2B (except that there are no protrusions $1c$).

In this case, in a portion of the brake drum 1 other than the notched end portions $1d$, as illustrated by the solid arrows in FIG. 2A and FIG. 2B described above, the magnetic fluxes from the permanent magnet 3 penetrate the switch plate 4 facing it to reach the brake drum 1, thereafter penetrate adjacent switch plates 4 to reach permanent magnets 3 facing the adjacent switch plates 4, and return through the magnet retention ring 2, as in the first embodiment. That is, magnetic circuits develop between the permanent magnet 3 and the brake drum 1.

In this state during braking, the magnetic circuits develop between the permanent magnets 3 and the brake drum 1, with a relative rotational speed difference occurring between them. For this reason, the magnetic fields on the inner peripheral surface of the brake drum 1 fluctuate. These fluctuations in magnetic fields cause eddy currents on the inner peripheral surface of the brake drum 1. The interaction between these eddy currents and the density of the magnetic fluxes from the permanent magnets 3 causes, under Fleming's left-hand rule, braking force in a direction opposite to the rotational direction on the brake drum 1 that rotates together with the rotating shaft 10 (see solid black arrows in FIG. 2A and FIG. 2B described above).

Note that in the case of the retarder in the second embodiment, regions where eddy currents are generated are small in the regions of notched end portion $1d$ of the brake drum 1 because the notch portions $1e$ are present there. For this reason, the braking force is reduced as compared with the retarder in the first embodiment.

Here, during braking, the brake drum 1 rotates while the permanent magnets 3 and the electricity generating coils 8 are at a standstill with their positions in the circumferential direction coinciding with each other. For this reason, the end portions $1d$ (projecting portions left after forming the notch portions $1e$) of the brake drum 1 are alternately brought into a state where they are positioned facing the electricity generating coils 8 (see FIG. 5A) and a state where they are positioned between electricity generating coils 8 adjacent to each other (see FIG. 5B and FIG. 6).

In the regions of the end portions $1d$ of the brake drum 1, as illustrated in FIG. 5A, when the end portions $1d$ are positioned facing the electricity generating coils 8, the magnetic fluxes from a permanent magnets 3 having penetrated a switch plate 4 further penetrate an end portion $1d$, reaching an electricity generating coil 8. These magnetic fluxes having reached the electricity generating coil 8 penetrate the electricity generating coil 8 to reach the coil support member 9, thereafter penetrate adjacent electricity generating coils 8, penetrate the end portions $1d$ facing the adjacent electricity generating coils 8, and further penetrate switch plates 4, returning to the permanent magnets 3 facing the switch plates 4. That is, magnetic circuits develop also between the permanent magnets 3 and the electricity generating coils 8.

In contrast, as illustrated in FIG. 5B, when the end portions $1d$ are positioned between the electricity generating coils 8 adjacent to each other, namely when the notch portions $1e$ are positioned facing the electricity generating coils 8, the end portions $1d$ do not face the electricity generating coils 8. For this reason, the magnetic circuits between the permanent magnets 3 and the electricity generating coils 8 are interrupted.

As seen from the above, during braking, magnetic fluxes repeatedly penetrate the electricity generating coils 8 through the notched end portions $1d$ of the brake drum 1, and the magnetic fields penetrating the electricity generating coils 8 fluctuate. This causes induced currents by electromagnetic induction to flow through the electricity generating coils 8, generating electricity.

Consequently, the retarder with an electricity generating function in the second embodiment also provides the same effect as in the first embodiment.

The smaller the gap between the electricity generating coils 8 and the notched end portions 1d of the brake drum 1, the better, but a practical size of the gap is about 1 to 2 mm. This is because an excessively small gap therebetween may cause accidental contact between the electricity generating coils 8 and the notched end portions 1d, leading to breakage, and on the other hand, an excessively large gap results in ineffective magnetic circuits between the permanent magnets 3 and the electricity generating coils 8 during braking.

In addition, it is preferable that the width of a single end portions 1d (a projecting portion left after forming the notch portions 1e) of the brake drum 1 along the circumferential direction is made substantially identical to the width of a single electricity generating coil 8. This is because such a width results in the development of effective fluctuations in magnetic fluxes penetrating the electricity generating coils 8 through the end portions 1d of the brake drum 1.

Furthermore, it is preferable to make the thickness of the notched end portions 1d of the brake drum 1 along their radial directions about 3 to 10 mm. This is because an excessively small thickness thereof results in ineffective fluctuations in magnetic fluxes penetrating the electricity generating coils 8 through the end portions 1d, and on the other hand, an excessively large thickness thereof results in ineffective magnetic circuits between the permanent magnets 3 and the electricity generating coils 8 during braking.

The shape of a single notched end portion 1d is not specially limited but is preferably a substantially rectangular-parallelepiped shape made by combining rectangular planes.

Additionally, the present invention is not limited to the embodiments described above, and various modifications may be made without departing from the gist and scope of the present invention. For example, the above embodiments have the configuration in which the magnet retention ring 2 is turned with respect to the switch plates 4 to switch between braking and non-braking using the turning switch mechanism, but may have a configuration in which the switch plates 4 are turned, as long as the magnet retention ring 2 and the switch plates 4 are relatively turned.

In addition, the above embodiments use permanent magnets as magnets for generating braking force as well as electricity, but these permanent magnets can be substituted with excitation coils (including iron cores) that serve as electromagnets. That is, the present invention is also applicable to a drum-type, electromagnet-type retarder. An electromagnet-type retarder dispenses with a turning switch mechanism to switch braking and non-braking. In this case, the switch plate retention ring 5 is eliminated together with the switch plates 4, and the magnet retention ring 2 is fixed to the stator support member 7. This is because switching between braking and non-braking can be performed by supplying or not supplying current to the excitation coils.

EXAMPLES

To confirm the effects of the present invention, a brake test was conducted as the following Examples 1 and 2.

Example 1

In Example 1, assume the configuration of the retarder in the first embodiment illustrated in FIG. 1, FIG. 2A to FIG. 2C, and FIG. 3 described above. That is, assume a configuration in which protrusions are provided on an end face of the brake drum, and electricity generating coils are provided facing the regions on the end face. The height of the protrusions was set at about 2 mm. As electricity generating coils, wound coils were prepared, each of which was made by winding 10 turns of a conductor on an iron core, and 32 of the wound coils were mounted and connected in series to one another. The value of electrical resistance of the conductor was set at about 0.37Ω.

As an inventive example, the brake test was conducted using a braking device having such a configuration, and braking forces and induced voltages were measured. These measurements were carried out at the time points when the number of revolutions of the rotating shaft was at 3600 rpm, 2400 rpm, 1800 rpm, 1200 rpm, 600 rpm, and 0 rpm.

Figure 7:
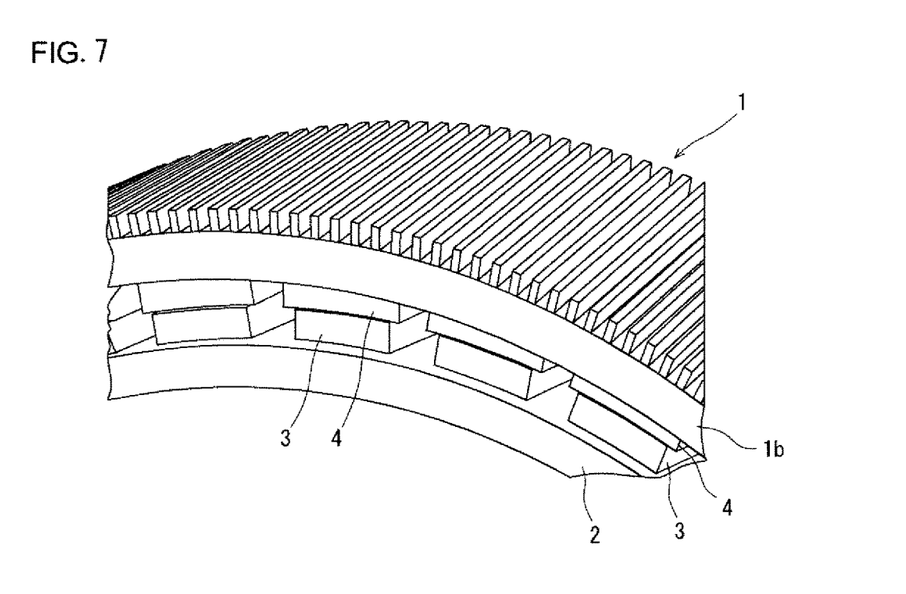
FIG. 7 is a partially enlarged perspective view of a retarder that is used as Comparative Example in a brake test in Example 1.

In addition, in order to investigate the influence of adding the electricity generating function on braking force, a braking device was used as Comparative Example, the braking device, as illustrated in FIG. 7, being provided with no protrusions on the end face 1b of the brake drum 1, and no electricity generating coils. Then, the brake test was conducted as with the above, and braking forces were measured.

From these measurement results, braking forces and generated powers were evaluated. As to the braking forces, the evaluation was made using ratios of the braking forces to one as a criterion that is a braking force (620 Nm) measured at the time point when the number of revolutions of the rotating shaft was at 3600 rpm in a brake test using Comparative Example. In addition, as to the generated powers, the evaluation was made using ratios of the generated powers to one as a criterion that is an induced voltage (10 V) measured when the number of revolutions of the rotating shaft was at 3600 rpm in a brake test in the inventive example.

Figure 8:
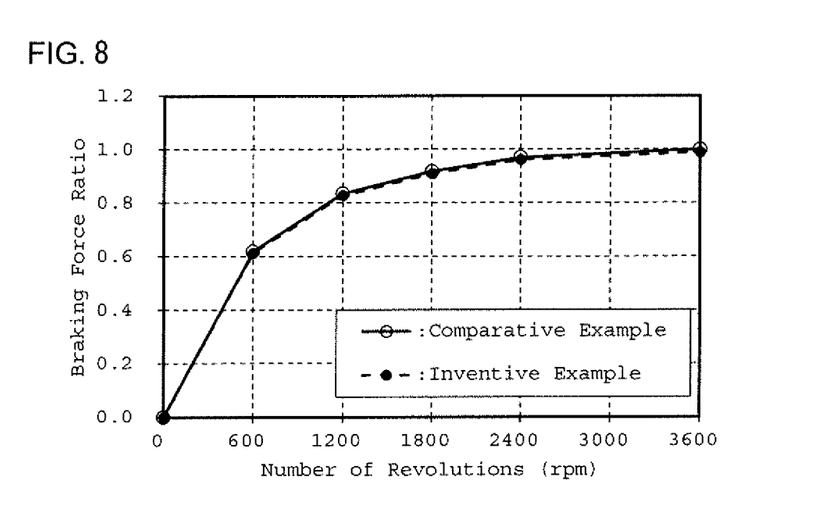
FIG. 8 is a graph illustrating the summary of how braking force changed, as the test results of Example 1.
Figure 9:
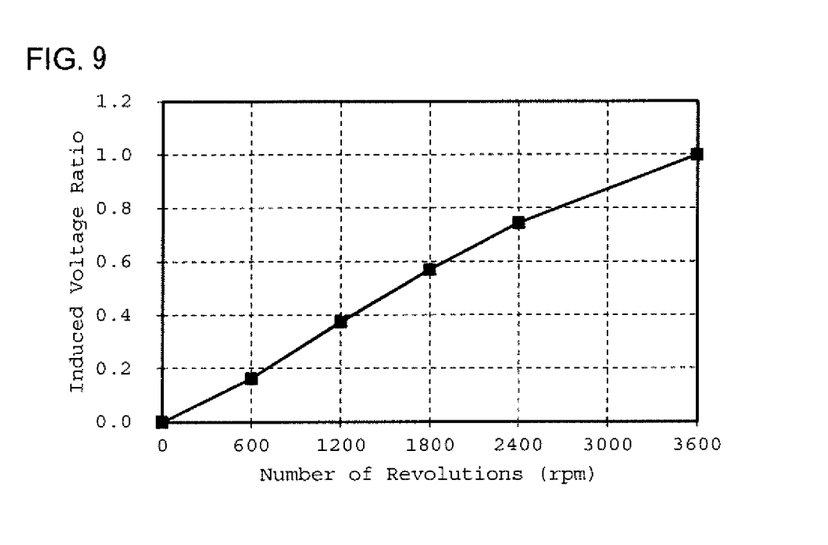
FIG. 9 is a graph illustrating the summary of how induced voltage changed, as the test results of Example 1.

FIG. 8 is a graph illustrating the summary of how the braking force changed, as the test results of Example 1. FIG. 9 is a graph illustrating the summary of how the induced voltage changed, as the test results of Example 1. As illustrated in FIG. 8, it is understood that the braking force was substantially the same between the retarder in the inventive example (in the first embodiment) and the retarder using the Comparative Example. It can be said, upon this, that the retarder in the first embodiment can secure a braking force as much as a braking device without the electricity generating function. In addition, as illustrated in FIG. 9, it is understood that the retarder in the inventive example (in the first embodiment) can generate electricity effectively.

Example 2

In Example 2, assume the configuration of the retarder in the second embodiment illustrated in FIG. 4, FIG. 5A to FIG. 5C, and FIG. 6. That is, assume a configuration in which notch portions are provided on an end portion of the brake drum, and electricity generating coils are provided facing the regions of the notched end portions from the outer peripheral surface side of the notched end portions.

The depth of the notch portions was changed at three levels in ratios of the depths to the overall length of the brake drum in its axial direction as 100% (inventive examples 1 to 3). Specifically, the depth of the notch portions was set at about 15.6% in the inventive example 1, about 21.4% in the inventive example 2, and about 27.2% in the inventive example 3. As electricity generating coils, wound coils were prepared, each of which was made by winding 10 turns of a conductor on an iron core having a size corresponding to the depth of the notch portion of each of the inventive examples 1 to 3, and 32 of the wound coils were mounted and connected in series to one another. The value of electrical resistance of the conductor was set at about 0.31Ω in the inventive example 1, about 0.38Ω in the inventive example 2, and about 0.44Ω in the inventive example 3.

The brake test was conducted using braking devices having such configurations, and braking forces and induced voltages were measured. These measurements were carried out at the time points when, as in Example 1, the number of revolutions of the rotating shaft was at 3600 rpm, 2400 rpm, 1800 rpm, 1200 rpm, 600 rpm, and 0 rpm.

From these measurement results, braking forces and generated powers were evaluated. As to the braking forces, the evaluation was made using ratios of the braking forces to one as a criterion that is a braking force (620 Nm) measured at the time point when the number of revolutions of the rotating shaft was at 3600 rpm in a brake test using, as in Example 1 described above, the Comparative Example. In addition, as to the generated powers, the evaluation was made using ratios of the generated powers to one as a criterion that is an induced voltage (10 V) measured when the number of revolutions of the rotating shaft was at 3600 rpm in a brake test in the inventive example in Example 1 described above.

Figure 10:
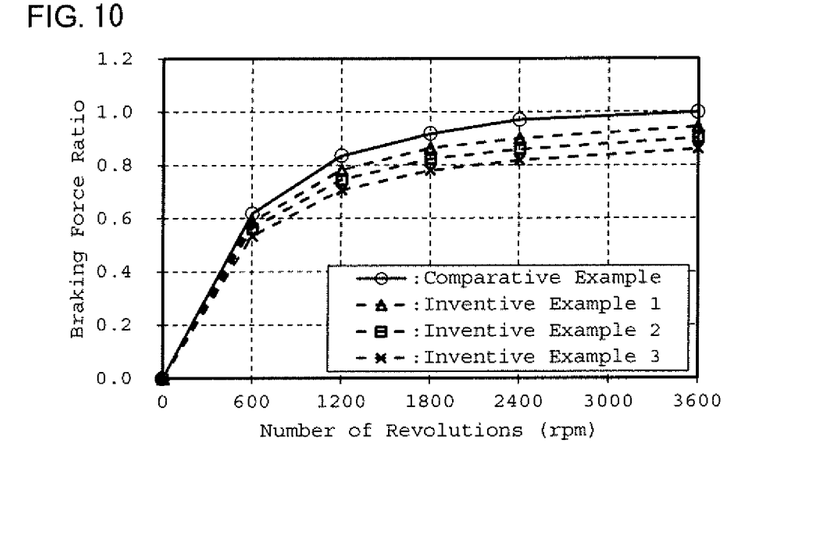
FIG. 10 is a graph illustrating the summary of how the braking force changed, as the test results of Example 2.

FIG. 10 is a graph illustrating the summary of how the braking force changed, as the test results of Example 2. As illustrated in FIG. 10, it is understood that the braking forces of the retarders in the inventive examples 1 to 3 (in the second embodiment) were nearly the same as compared with the retarder in the Comparative Example, although there are slight reductions from the retarder in the Comparative Example. It can be said, upon this, that the retarder in the second embodiment can secure a braking force as much as a braking device without the electricity generating function. Note that the reductions in braking force correspond to the depths of the notch portions provided in end portions of the brake drums.

Figure 11:
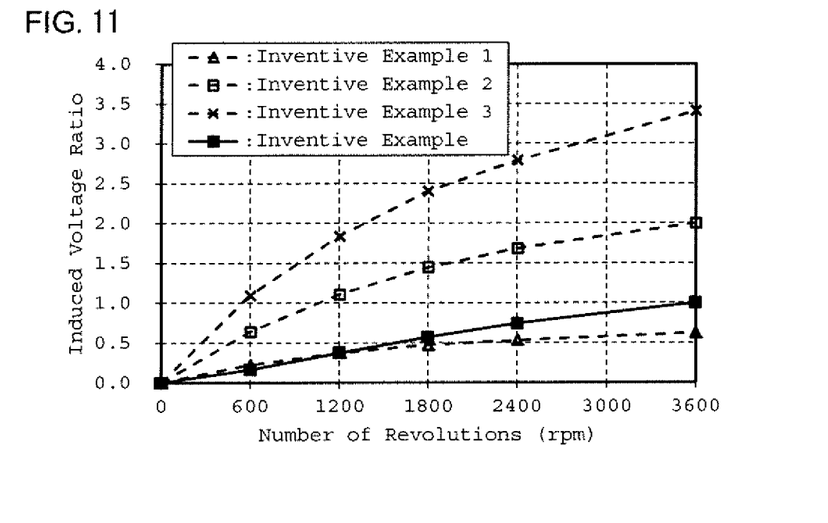
FIG. 11 is a graph illustrating the summary of how the induced voltage changed, as the test results of Example 2.

FIG. 11 is a graph illustrating the summary of how the induced voltage changed, as the test results of Example 2. As illustrated in FIG. 11, it is understood that, as compared with the retarder in the inventive example in Example 1 described above, the induced voltages of the retarders in the inventive examples 1 to 3 (in the second embodiment) are small if the notch portions provided in the end portion of the brake drum have a small depth (the inventive example 1), and are large if the notch portions have a large depth (the inventive examples 2 and 3). It can be said that the retarder in the second embodiment can generate electricity more effectively than in the first embodiment depending on the depths of the notch portions.

INDUSTRIAL AVAILABILITY

The eddy current retarder with an electricity generating function according to the present invention is highly useful as an auxiliary brake for all kinds of vehicles including HEVs and EVs.

REFERENCE SIGNS LIST

1: Brake drum
1a: Radiator fin
1b: End face
1c: Protrusion
1d: End portion
1e: Notch portion
2: Magnet retention ring
3: Permanent magnet
4: Switch plate
5: Switch plate retention ring
6: Rotor support member
7: Stator support member
8: Electricity generating coil
9: Coil support member
10: Rotating shaft

The invention claimed is:

1. An eddy current retarder with an electricity generating function, comprising:
   a cylindrical braking member that is fixed to a rotating shaft of a vehicle;
   a magnet retention member of a ferromagnetic material that is arranged inside the braking member, the magnet retention member retaining a plurality of magnets at regular intervals entirely in a circumferential direction such that the magnets face an inner peripheral surface of the braking member; and
   a brake switching mechanism that switches, during braking, to a state in which magnetic circuits develop between the magnets and the braking member, and switches, during non-braking, to a state in which no magnetic circuits develop, wherein
   a plurality of protrusions are provided on an end face of the braking member in an axial direction at regular intervals entirely in the circumferential direction, the end face being one of both end faces of the braking member, the one end face facing in the axial direction,
   a plurality of electricity generating coils are provided in a non-rotating part of the vehicle at regular intervals entirely in the circumferential direction such that the electricity generating coils face regions of the one end face of the braking member where the protrusions are provided, and
   during braking, positions of the magnets coincide with positions of the electricity generating coils in the circumferential direction.

2. The eddy current retarder with an electricity generating function according to claim 1, wherein
   the magnets are permanent magnets, and
   the permanent magnets are arranged such that orientation of the magnetic poles of each permanent magnet is in a radial direction, and the permanent magnets are arranged such that different magnetic poles of adjacent permanent magnets in the circumferential direction alternate.

3. The eddy current retarder with an electricity generating function according to claim 2, wherein
   as the brake switching mechanism, a plurality of switch plates of a ferromagnetic material are provided in a gap between the inner peripheral surface of the braking member and the permanent magnets at regular intervals entirely in the circumferential direction such that an arrangement angle of the switch plates matches an arrangement angle of the permanent magnets, and
   the switch plates are configured to turn relatively to the magnet retention member in the circumferential direction, is kept during braking in a state of being superposed on the permanent magnets, and is kept during non-braking in a state of bridging between the permanent magnets adjacent to each other.

* * * * *